Feb. 2, 1932.  E. I. McKESSON  1,843,169
FLOW HANDLING FOR SURGICAL TREATMENTS
Filed April 20, 1925   4 Sheets-Sheet 1
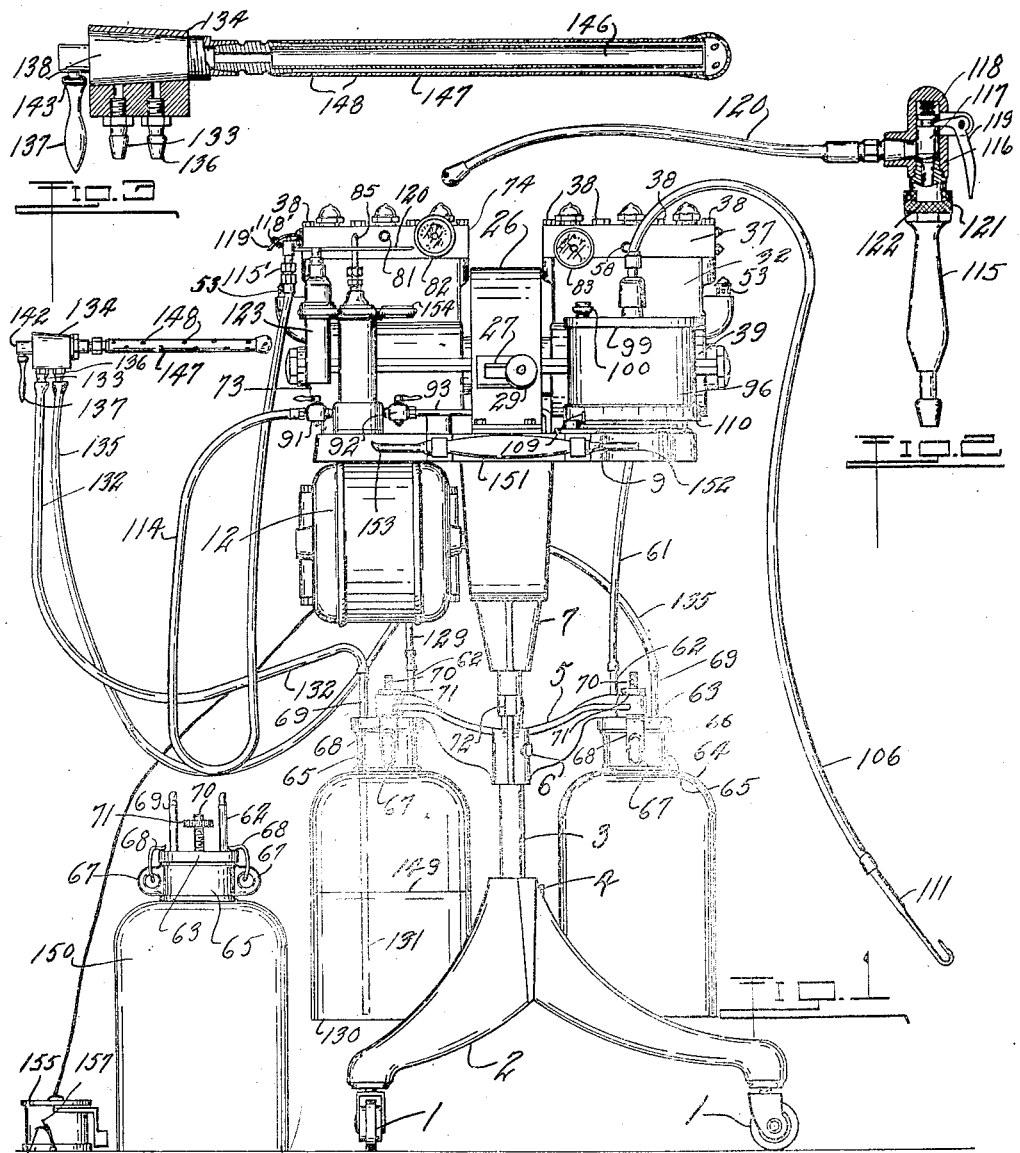

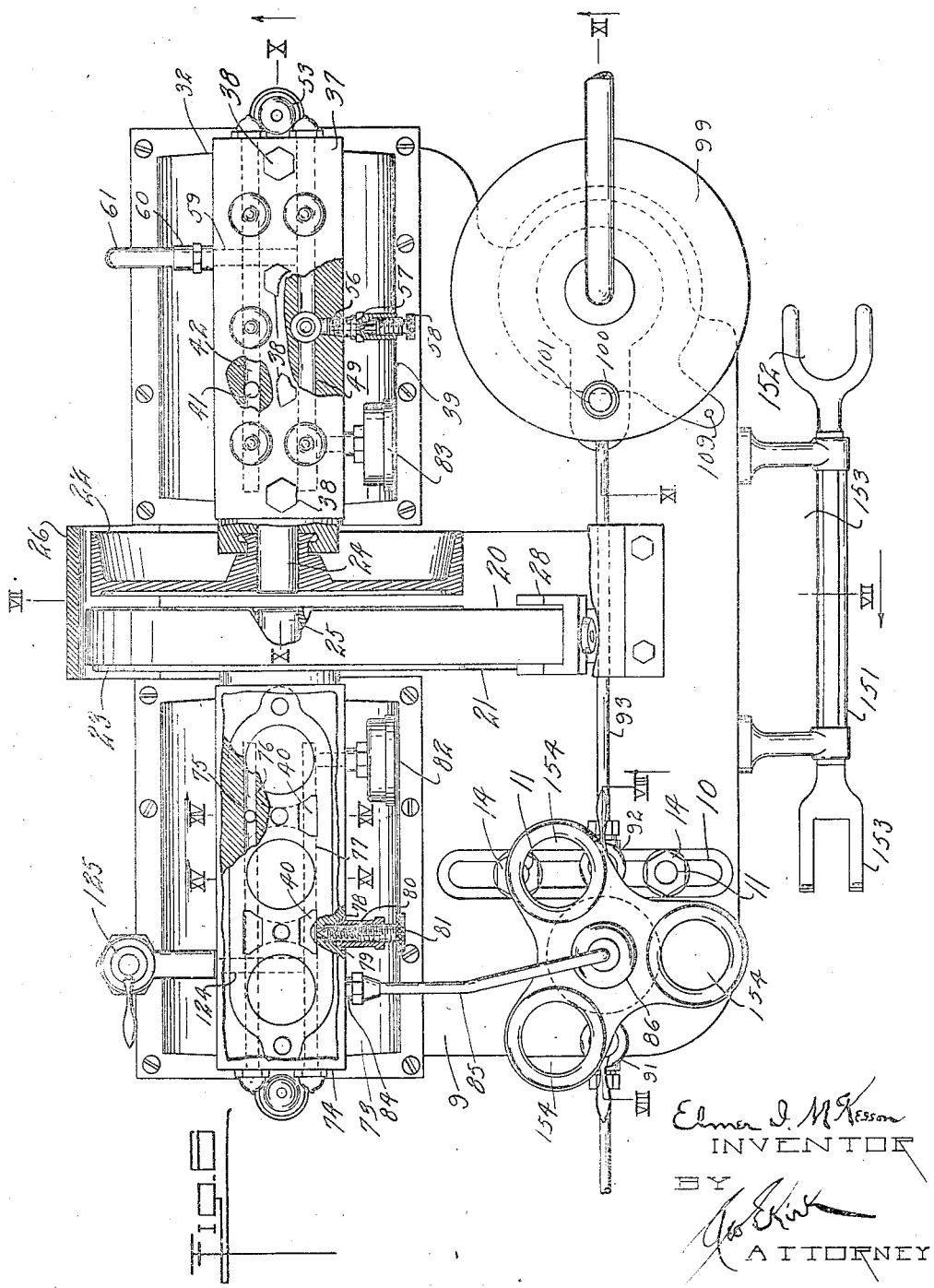

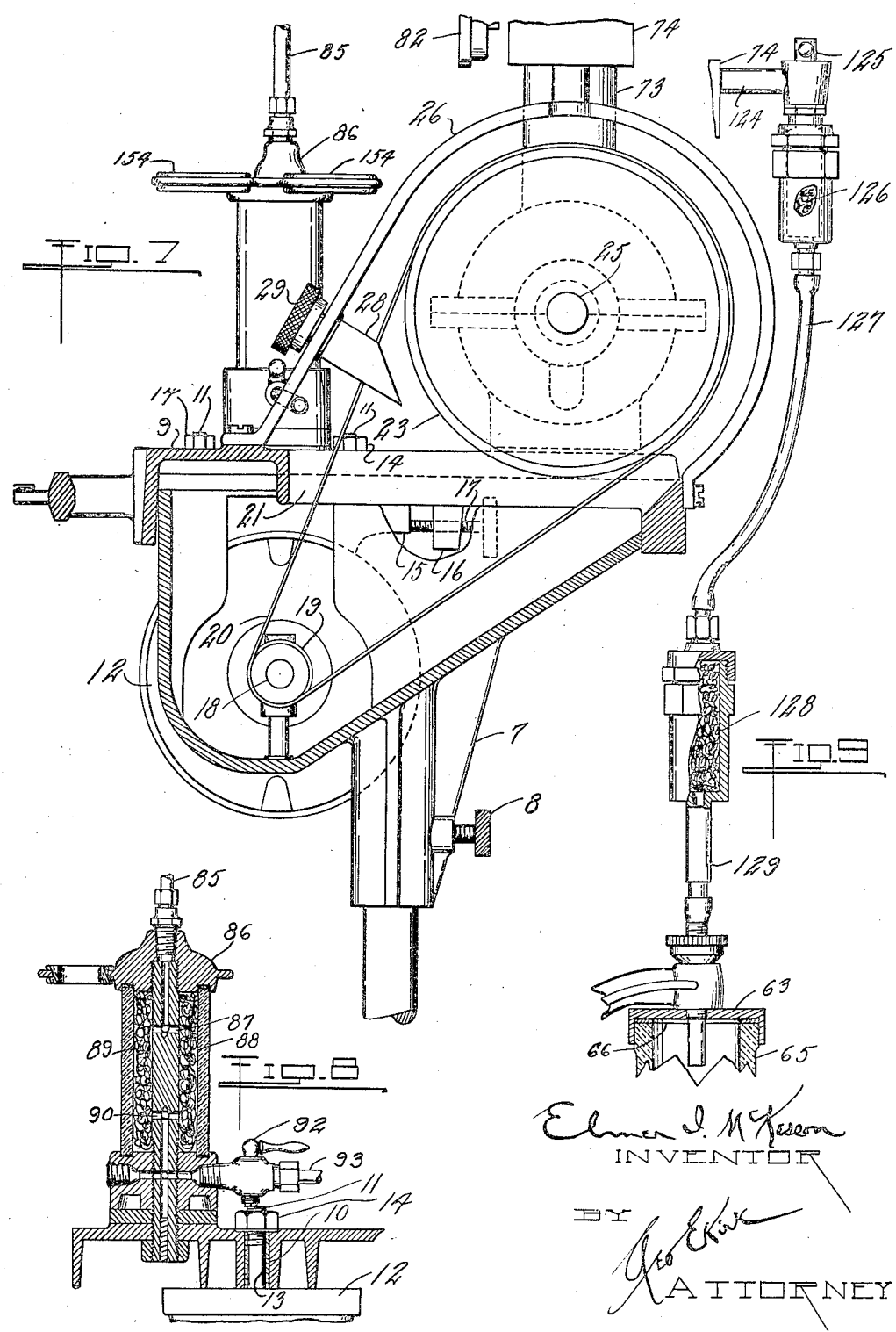

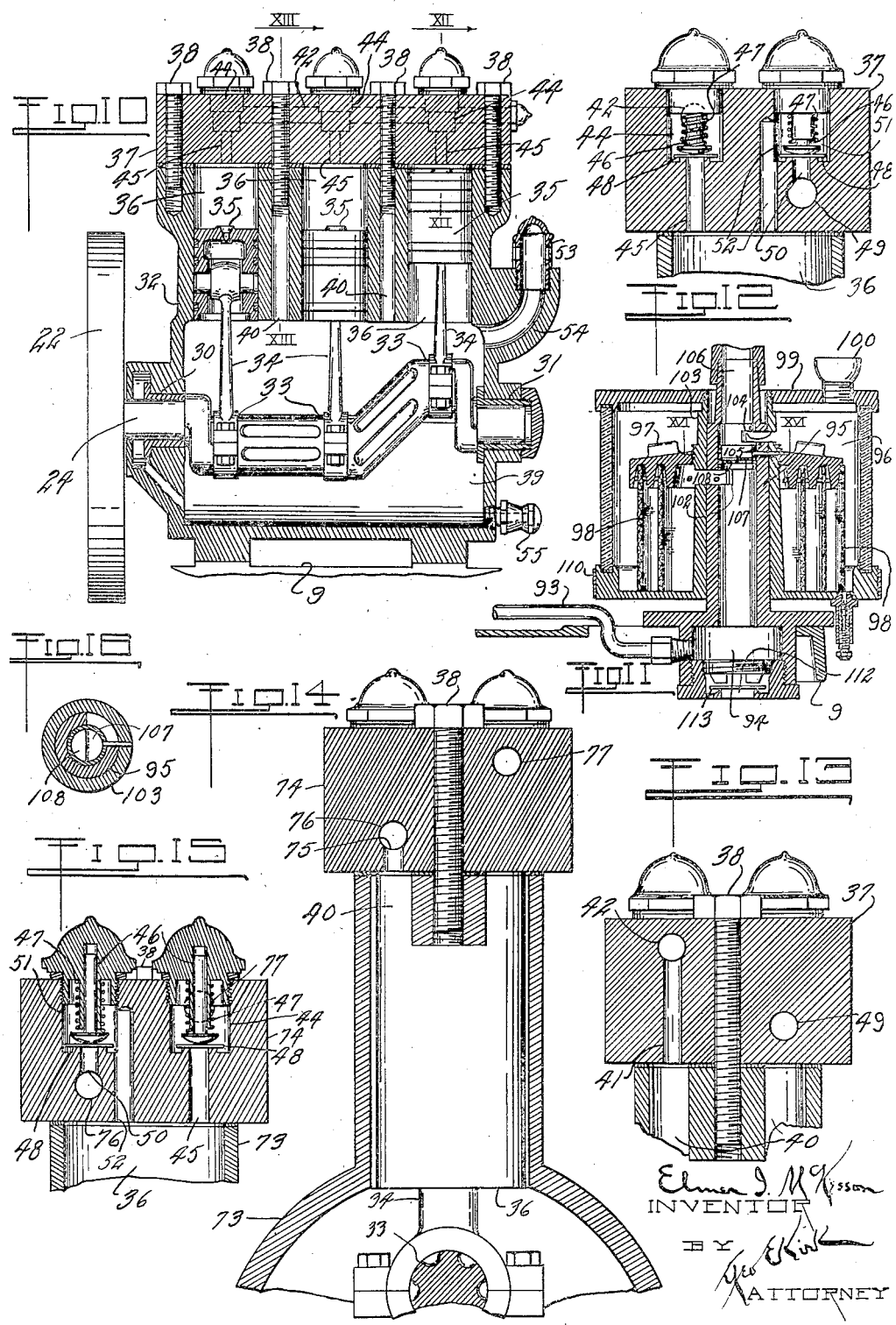

Patented Feb. 2, 1932

1,843,169

UNITED STATES PATENT OFFICE

ELMER I. McKESSON, OF TOLEDO, OHIO

FLOW HANDLING FOR SURGICAL TREATMENTS

Application filed April 20, 1925. Serial No. 24,582.

This invention relates to supply and removal of gas or liquids.

This invention has utility in controlling liquid and gaseous conditions in a portion of the human body, more particularly in regions under treatment, even to the extent of removal, washing, or irrigation and replacement of material subjected to flow.

Referring to the drawings:

Fig. 1 is a front view of an embodiment of the invention, parts being broken away;

Fig. 2 is a detail view, partially in section, of a tool or hand-piece for flow control in the instance of Fig. 1, as assembled for removal of liquids by suction, as for blood in tonsil operations;

Fig. 3 is a detail view, parts being broken away, of the combination hand-piece or tool shown in Fig. 1, as connected for irrigation operations, that is for selectively withdrawing and re-supplying a flow of either liquid or gaseous material;

Fig. 4 is a further detail view of valve control features of the hand-piece of Fig. 3, showing the ported plug;

Fig. 5 is a section on the line V—V, Fig. 4, showing the port arrangement of the hand-piece;

Fig. 6 is a plan view of the apparatus of Fig. 1, parts being broken away;

Fig. 7 is a partial section on the line VII—VII, Fig. 6;

Fig. 8 is a partial section on the line VIII—VIII, Fig. 6;

Fig. 9 is a fragmentary view of the pressure bottle connection from the apparatus;

Fig. 10 is a partial section on the line X—X, Fig. 6;

Fig. 11 is a partial section on the line XI—XI, Fig. 6;

Fig. 12 is a section on the line XII—XII, Fig. 10;

Fig. 13 is a section on the line XIII—XIII, Fig. 10;

Fig. 14 is a partial section on the line XIV—XIV, Fig. 6;

Fig. 15 is a partial section on the line XV—XV, Fig. 6; and

Fig. 16 is a section on the line XVI—XVI, Fig. 11.

*Frame.*—Portably mounted, as on casters 1, is base 2 carrying standard 3 connected with the base 2 by set screw 4. In the upward extent of this standard 3 is spider 5 fixed by set screw 6 in position on the standard 3. Upwardly from the spider 5, the standard 3 carries frame 7 (Fig. 7) fixed with the standard 3 by set screw 8. This frame 7 mounts platform 9 having slot 10 (Figs. 6, 8) through which extend stud bolts 11 to motor 12. Sleeves 13 are about these bolts 11, and nuts 14 engaging these bolts 11 and the upper portion of the platform 9 serve to mount the motor 12 in depending position from the platform 9.

*Drive.*—Fixed with the motor 12 is lug or abutment 15 (Fig. 7). Fixed with the platform 9 and depending therefrom is lug 16 from which extends adjusting screw 17 to engage the lug 15 for shifting the motor 12 as suspended by the bolts 11 in the slot 10. The motor 12 has shaft 18 carrying pulley 19 from which upwardly extends belt 20 through opening 21 in the platform 9. Pulleys 22, 23, (Fig. 6) on aligned shafts 24, 25, are disposed adjacent each other. Housing 26 over these pulleys 22, 23, has slot 27 (Figs. 1, 6, 7). Fork 28 having thumb nut 29 thereon is shiftable in this slot 27 to move the belt 20 into position to be fully on the pulley 22; to be fully on the pulley 23; or to engage both pulleys 22, 23. At the desired adjusted position, the thumb nut 28 is turned into clamping position with the plate surrounding the slot 27 thereby to insure an effective holding of the belt 20 in the desired relation.

*Suction pump.*—The shaft 24 is mounted in bearings 30, 31 (Fig. 10), in the housing 32 carried by the platform 9. This shaft 24 between bearings 30, 31, is shown as provided with crank portions 33, 120° apart, from which extend upwardly connecting rods 34 to pistons 35 in cylinders 36. These cylinders 36 are provided with head 37 assembled by bolts 38 with the frame 32 carrying the cylinders 36. Between the cylinders 36 from the crank case 39 are passages 40. From one of these passages 40 is duct 41 in communication with duct 42 in the head 37

(Figs. 6, 10, 12, 13). This duct 42 extends lengthwise of the head 37 over the three cylinders connecting valve chambers 44. Each of these valve chambers 44 is in communication by port 45 (Fig. 12) with the cylinder 36 therebelow. In each of these valve chambers is a plunger 46 having spring 47 abutting valve cap 48 tending normally to hold such valve seated.

Parallel with the duct 42 is duct 49 from which upwardly extend ports 50 to valve chambers 51 wherein valves 46 as actuated by spring 47 abut against caps 48 and serve to normally close these ports 50. These valve chambers 51 are in communication by ports 52 with the respective cylinders 36 therebelow. Accordingly, on the descent of the piston 35 in its cylinder 36, there is pull exerted through the port 52 reducing the pressure in the valve chamber 51 so that this valve 46 is unseated. There may be flow from the duct 49 by way of the valve chamber 51 and the port 52 into the cylinder 36. As the piston 35 ascends into the cylinder 36, the valve 46 in the chamber 51 is at once seated. The building up of pressure in the cylinder 36 as the valve 35 moves toward this head 37, is transmitted by port 45 to inside valve 46 in the chamber 44 thereby allowing the escape of the gas and air or other material being pumped by way of ducts 42, 41, into the crank case 39. Accordingly, in the operation of the pulley 22 this multi-cylinder pump is an exhausting or suction pump for producing vacuum in the duct 42 and the passages or reservoirs connected therewith. This crank case 39 may have the gas as exhausted therein to flow through the bearings 31 (Fig. 10) as well as leak through breather cap 53, which cap 53 also serves as a filling opening for duct 54 for supplying lubricant to the crank case 39. The lubricant in this crank case 39 may be drained at times by removal of plug 55. This exhaust into the crank case in the operation of this vacuum pump is a factor in making the machine quiet in operation.

In communication with the duct 49 is plug 56 having valve 57 therein adjustable by screw 58. This device serves as a vacuum pressure regulator for this duct 49 in the operation of the vacuum pump. From this duct 49 extends duct 59 to connection 60 with flexible duct 61 (Figs. 1, 6) as a suction line extending to communicate by duct 62 through cap 63 thereby communicating with the interior of receiver or bottle 64. This bottle 64 has its neck 65 with integral ears 67 from which upwardly extend spring arms 68 to engage the cap 63 and thereby hold such cap snugly against its gasket 66 in air tight assembly.

*Vacuum bottle mounting.*—From the bottle 64 extends duct 69. This cap 63 central thereof has upwardly extending threaded stud 70 on which is nut 71. This stem 70 may be thrust through fork opening 72 in the arm or spider 5 and the nut 71 engage the upper arm of the spider 5 for suspending the bottle 64 thereby mounting the bottle to be carried with this apparatus on the standard 3.

*Force pump.*—The shaft 25 is similar to the shaft 24 but oppositely extends into housing 73. The three cylinders 36 in this housing 73 above the crank case 39 are provided with a head 74. From one of the passages 40 between the cylinders 36 over the crank shaft 25 is duct 75 (Figs. 6, 14, 15) in communication with duct 76 extending over the cylinders 36 connected by port 50 with valve chambers 51. These valve chambers 51 are connected by ports 52 to the respective cylinders 36. In the valve chambers 51, are valves 46 engaging valve caps 48 for closing the ports 50. In this valve head 74 are ports 45 extending to valve chambers 44 connected by duct 77. In the valve chambers 44 are valves 46 normally held by springs 47 as operating against valve caps 48 in maintaining closed the ports 45.

As the shaft 25 is rotated to have the pistons 35 move downward away from the head 74, there is an intake of air from the crank case 39 in this housing 73 as entering about the bearings, as well as by way of the breather cap 53. This intake of air passing by way 40 between the cylinders 36 thence by ducts 75, 76, is effective for lifting the valves 51 off the ports 50 for passing by chambers 51 and ports 52 into the cylinders 36.

As the shaft 25 further rotates to have the pistons 35 move toward the head 74, the valves 46 at once seat to cut-off the in-flow by duct 76 and out-flow commences by way of ports 45 to chambers 44 and the duct 77. This is pressure delivery to the duct 77.

Mounted on the duct 77 (Fig. 6) is plug 78 having valve 79 adjustably held by spring 80 as controlled by set screw 81. This device serves as a pressure regulator in determining the pressure as built up in this duct 77 by this multi-cylinder force pump. Gage 82 is an indicator of the pressure as built up in this duct 77, which pressure in practice may run to twenty pounds. The vacuum as developed in the duct 49 of the companion multi-cylinder pump is disclosed by gage 83 and the extent of this vacuum may run to respond to twenty-five inches of mercury.

*Filter.*—The duct 77 has communication by duct 84 and tube 85 (Figs. 1, 6, 7, 8) to head 86 having communication by ports 87 with chamber 88 shown as filled with filtering material 89. This material may be of a character for sterilizing any contamination in the air as brought under pressure and such air as passing from this chamber 88 by port 90 may have flow therefrom controlled by valve 91 or valve 92.

*Vaporizer.*—The valve 92 is connected by duct 93 (Figs. 1, 11) to chamber 94 from which upwardly extends tubular stem 95 as a bearing mounting chamber 96 herein shown as a vaporizer or ether cup having spider 97 carrying depending capillary spiral 98 of wicking. This ether cup is provided with cover 99 having funnel 100 from which may be removed plug or stopper 101 for pouring a desired charge of say, ether, to extend but fractionally up in this chamber. The stem 95 is provided with port 102 which when in full registry position with member 103 of the vessel 96 conducts the gas supply from the duct 93 to flow into this chamber 96 and thence to pass by ports 104, 105, to duct 106. Diaphragms 107, 108, in the tubular stem 95, between the ports 102, 104, are of approximately 180° in extent and at fully registering position of the ports 102, 103, and the ports 104, 105, shut off direct flow from the stem 95 to the duct 106. Fixed stud 109 as coacting with scale 110 (Fig. 1) carried by the vaporizer vessel 96 discloses the proportional opening of these ports, and accordingly the relative quantity of the gas flowing therethrough for picking up ether vapor or other anæsthetic promotion substance.

From this vaporizer, a duct 106 is shown as extending to mouth hook 111 so that the patient undergoing treatment may have as an inhalation supply an anæsthetic which supply is readily controlled by manipulation of the valve 92. In the event the valve 92 be closed and the patient inhales to create suction in the line 106, such suction may be effective for mild anæsthesia, for the chamber 94 is provided with intake port 112 normally closed by check disk 113 readily lifted by suction effected in the chamber 94 so that there may be in-flow of air to the chamber 94 and thence by way of the vaporizer chamber 96 in such adjusted proportion as the disks 107, 108, may determine.

The valve 91 from the pressure filter or sterilizer chamber 98 may be connected to duct 114 provided with hand-piece 115. This hand-piece 115 is shown as having port 116 (Fig. 2) normally closed by plug 117 as acted on by spring 118. Lever 119 may be readily manipulated by the thumb of the operator against the resistance of the spring 118 so that there may be flow of air by way of the duct 120. Loose collar 121 on this hand-piece or tool 115 has clearance notch 122 so that in the depression of the lever 119 into port opening position this collar 121 may be rotated to hold the valve open. This hand-piece may be used in either pressure or suction operations. The duct 114 to hand-piece 115' (Fig. 1) has lever 114' operable against the resistance of spring 118' (Fig. 1) to co-operate with vaporizer 123 to deliver sterilizing vapor as for coating in the region of the operations as may be conducted under the machine of this disclosure.

*Liquid delivery.*—The force pump has from the passage 77, duct 124 to valve 125 which on opening may permit flow by pressure filter chamber 126 to duct 127 (Figs. 1, 6, 9) thence through supplemental filter 128 connected by duct 129 with duct 62 of bottle 130 similar to the receiver or bottle 64. This bottle 130 has its head and mounting similar to the bottle 64. This bottle 130 serves as a reservoir for delivery of liquid, and may have duct 131 extending to the lower portion thereof, thence communicating with outlet duct 69 having duct 132 to connection 133 at hand-piece 134.

*Pressure suction hand-piece.*—The duct 69 from the vacuum bottle 64 is connected by duct 135 to fitting 136 at this hand-piece 134. This hand-piece 134 (Figs. 1, 3, 4, 5) is provided with handle 137 operating plug 138 having central duct 139 in communication with ports 140, 141. At angular position 142 of the handle 137, this valve member 134 is connected for suction action as effective through the duct 135. At position 143 of the handle 137, this plug valve 138 is connected to have its port 141 in communication with the duct 132 for pressure action. At position 145' at the handle 137, the plug valve 138 is shifted to have port 145 connect the duct 132 to the duct 135 for flushing the duct 135 by pressure flow from the receiver 130. At intermediate position 144', the handle 137 cuts off flow as to this control hand-piece 134.

This tool 134 is shown as having mounted thereon duct terminus 146 shielded by tube 147 having perforations therein. This tool or adapter, as a terminus, may be placed in the cavity for undergoing treatment and serve for holding the walls of the cavity against total collapse while along the region of such insertion there may be, through these ports or perforations 148, a withdrawal of pus, blood, or diseased fluids or liquid or even removal of gas. As such removal has occurred with the valve handle 137 in position 142, the material thus removed is delivered into the receiver 64. By shifting the handle 137 independently of disturbing the position of use of this duct terminus, there may be cutting off of the suction action by way of the duct 135. Connection of pressure by shifting this handle 137, to the position 143 may be effected. This pressure connection may deliver liquid 149 as a disinfecting wash for the region. By shifting the handle 137 to place the port 141 into registry with the connection 136, there may be withdrawal of this supply material 149. There is thus brought about an irrigation of the diseased portion or that portion or region acted upon or undergoing treatment. This evacuation and replenishment may be repeated as desired in the conduct of irrigation treatment with no disturbance of the location of the duct terminus, which insertion or location may, as placed, be disinfected and the region locally treated as desired by the vaporizer as controlled by the hand-piece or tool 115'. There may be replenishment of the saline solution or recharge of blood as desired which may be from a supplemental vessel 150 to be connected in place of the vessel 130. This manipulation is one of great advantage in controlling the treatments, especially in surgical operations, and enables the operator at all times to maintain as near normal conditions as possible in the regions of treatment or effecting treatment.

The duct terminus 147 is a substitutive fitting for which may be supplied an unshielded duct terminus, or a duct terminus of desired diameter, enlarged end, or reduced end, or even bent terminus.

In the shifting of the machine of this disclosure, the handle (Figs. 1, 6) 151 may be used. When the machine is in the desired position for conducting the operation, extensions which may be loosely hung in rests 152, 153, 154, may be withdrawn for the desired locations. The seat 154 may, as shown, suspend the vaporizer 123 for various solutions or sprays. With the machine in position, switch 155 may be turned on as power control lines 156, 157, are connected to electric power source. The motor 12 as thus starting may be given a light load on one of the pulleys 22 or 23, and as the machine gets under way shifting may be made of the belt 20 to the vacuum pump, if that be the operation to be conducted; to the force pump pulley 23, if that be the operation to be conducted; or to mid-position for driving belt 20 and pulleys 22, 23, when both the vacuum and force operations are desired, as in irrigation operations.

In the machine of this disclosure, it is, accordingly, possible from this common power source with mouth-piece 111, or other type of mask, to maintain a patient under a degree of anæsthesia. By the controllable hand-piece 115' there may be disinfecting or painting of the region of the operation, or merely a blowing of foreign matter clear of the working region. By the manipulation of the hand-piece 134 there may be the evacuation, replacement, or irrigation incidental to the local treatment and speed of care of the patient. The positive pressure is disclosed by the gauge 82. The negative pressure is disclosed by the gauge 83. The pressure adjustments may be varied by thread leakage at the screws 81, 58. The valves permit that flexibility in operation for wide range of utility in practice as may meet the conditions with which surgeons are confronted.

What is claimed and it is desired to secure by United States Letters Patent is:

1. Surgical apparatus comprising a source of fluid under pressure, a source of suction, a common power drive for said sources, a terminus, said terminus consisting of tubular means having a passage therethrough, a duct connecting the pressure source means to one end of the terminus, a duct connecting the suction source to the same end of the terminus, and a single control means mounted on the terminus adjacent said end and adapted to selectively establish communication between the pressure supply and the passage in the terminus and between the suction supply and the passage in the terminus.

2. Surgical apparatus comprising a source of fluid under pressure including a liquid supply chamber, a source of suction including a receiving chamber, a common power drive for said sources, a terminus, said terminus consisting of tubular means having a passage therethrough, a duct connecting the pressure source means to one end of the terminus, a duct connecting the suction source to the same end of the terminus, and a single control means mounted on the terminus adjacent said end and adapted to selectively establish communication between the pressure supply and the passage in the terminus and between the suction supply and the passage in the terminus.

3. Surgical apparatus comprising a source of fluid under pressure including a liquid supply chamber, a source of suction including a receiving chamber, a common power drive for said sources, a terminus, said terminus consisting of tubular means having a passage therethrough, and a perforated shield about the outlet of the passage, a duct connecting the pressure source means to one end of the terminus, a duct connecting the suction source to the same end of the terminus, and a single control means mounted on the terminus adjacent said end and adapted to selectively establish communication between the pressure supply and the passage in the terminus and between the suction supply and the passage in the terminus.

4. Surgical apparatus comprising a source of fluid under pressure, a source of suction, a common power drive for said sources, a terminus, said terminus consisting of tubular means having a passage therethrough and a perforated shield about the outlet of the passage, a duct connecting the pressure source means to one end of the terminus, a duct connecting the suction source to the same end of the terminus, and a single valve control means mounted on the terminus adjacent said end and adapted to selectively establish communication between the pressure supply and the passage in the terminus and between the suction supply and the passage in the terminus.

5. Surgical apparatus comprising a source of fluid under pressure, a source of suction, a common power drive for said sources including control means for connecting the drive to either or both of said sources, a terminus, said terminus consisting of tubular means having a passage therethrough, a duct connecting the pressure source means to one end of the terminus, a duct connecting the suction source to the same end of the terminus and a single control means mounted on the terminus adjacent said end and adapted to selectively establish communication between the pressure supply and the passage in the terminus and between the suction supply and the passage in the terminus.

6. Surgical apparatus comprising a source of fluid under pressure, a source of suction, a common power drive for said sources including a motor, control means for connecting the motor to drive either or both of said sources, a terminus, said terminus consisting of tubular means having a passage therethrough, a duct connecting the pressure source means to one end of the terminus, a duct connecting the suction source to the same end of the terminus, and a single control means mounted on the terminus adjacent said end and adapted to selectively establish communication between the pressure supply and the passage in the terminus and between the suction supply and the passage in the terminus.

7. Surgical apparatus comprising a source of fluid under pressure, a source of suction, a common power drive for said sources including a motor, opposing pulleys in adjacent relation for actuating said sources, a belt from the motor, and a shifter for moving the belt for driving either or both of said pulleys, a terminus, said terminus consisting of tubular means having a passage therethrough, a duct connecting the pressure source means to one end of the terminus, a duct connecting the suction source to the same end of the terminus, and a single control means mounted on the terminus adjacent said end and adapted to selectively establish communication between the pressure supply and the passage in the terminus and between the suction supply and the passage in the terminus.

8. Surgical apparatus comprising a source of fluid under pressure, a source of suction, a common power drive for said sources including a driving belt, a pair of pulleys, and a belt shifter effective for positioning the belt on either or both of said pulleys, a terminus, said terminus consisting of tubular means having a passage therethrough, a duct connecting the pressure source means to one end of the terminus, a duct connecting the suction source to the same end of the terminus, and a single control means mounted on the terminus adjacent said end and adapted to selectively establish communication between the pressure supply and the passage in the terminus and between the suction supply and the passage in the terminus.

9. Surgical apparatus comprising a source of fluid under pressure, a source of suction, source pressure adjustment means, a common power drive for said sources, a terminus, said terminus consisting of tubular means having a passage therethrough, a duct connecting the pressure source means to one end of the terminus, a duct connecting the suction source to the same end of the terminus, and a single control means mounted on the terminus adjacent said end and adapted to selectively establish communication between the pressure supply and the passage in the terminus and between the suction supply and the passage in the terminus.

10. Surgical apparatus comprising a source of fluid under pressure, adjustment means therefor, a source of suction, a common power drive for said sources, a terminus, said terminus consisting of tubular means having a passage therethrough, a duct connecting the pressure source means to one end of the terminus, a duct connecting the suction source to the same end of the terminus, and a single control means mounted on the terminus adjacent said end and adapted to selectively establish communication between the pressure supply and the passage in the terminus and between the suction supply and the passage in the terminus.

11. Surgical apparatus comprising a source of fluid under pressure, a source of suction, adjustment means for said suction, a common power drive for said sources, a terminus, said terminus consisting of tubular means having a passage therethrough, a duct connecting the pressure source means to one end of the terminus, a duct connecting the suction source to the same end of the terminus, and a single control means mounted on the terminus adjacent said end and adapted to selectively establish communication between the pressure supply and the passage in the terminus and between the suction supply and the passage in the terminus.

12. Surgical apparatus comprising a source of fluid under pressure including a pump, a supply chamber, a mounting for the pump and chamber, a filter between said pump and chamber sustained therewith, a source of suction, a common power drive for said sources, a terminus, said terminus consisting of tubular means having a passage therethrough, a duct connecting the pressure source means to one end of the terminus, a duct connecting the suction source to the same end of the terminus, and a single control means mounted on the terminus adjacent said end and adapted to selectively establish communication between the pressure supply and the passage in the terminus and between the suction supply and the passage in the terminus.

13. Surgical apparatus comprising a source of fluid under pressure including a pump, a filter, a supply chamber to which the pump delivers through said filter, a source of suction, a common power drive for said sources, a terminus, said terminus consisting of tubular means having a passage therethrough, a duct connecting the pressure source means to one end of the terminus, a duct connecting the suction source to the same end of the terminus, and a single control means mounted on the terminus adjacent said end and adapted to selectively establish communication between the pressure supply and the passage in the terminus and between the suction supply and the passage in the terminus.

14. Surgical apparatus comprising a source of fluid under pressure, a source of suction, a common power drive for said sources, a terminus, said terminus consisting of tubular means having a passage therethrough, a duct connecting the pressure source means to one end of the terminus, a duct connecting the suction source to the same end of the terminus, and a controller device adjacent said terminus shiftable for placing either source in communication with said terminus independently of the other and for cutting out both of said sources from delivery at said terminus.

15. Surgical apparatus comprising a source of fluid under pressure, a source of suction, a common power drive for said sources, a terminus, said terminus consisting of tubular means having a passage therethrough, a duct connecting the pressure source means to one end of the terminus, a duct connecting the suction source to the same end of the terminus, and a controller adjacent said terminus shiftable independently of shifting either of said ducts to connect said pressure source and said suction source for cleansing action of the suction duct from said controller.

16. Surgical apparatus comprisng a source of fluid under pressure, a source of suction, a common power drive for said sources, a terminus for access to a desired region to be treated, said terminus consisting of tubular means having a passage therethrough, a duct connecting the pressure source means to one end of the terminus, a duct connecting the suction source to the same end of the terminus, and a single control means mounted on the terminus adjacent said end and adapted to selectively establish communication between the pressure supply and the passage in the terminus and between the suction supply and the passage in the terminus independently of shifting said ducts and independently of removal of said terminus.

17. Surgical apparatus comprising a source of fluid under pressure, a source of suction, a common power drive for said sources, a terminus, said terminus consisting of tubular means having a passage therethrough, a duct connecting the pressure source means to one end of the terminus, a duct connecting the suction source to the same end of the terminus, and controllable suction and pressure connections to said ducts effective for treating through said terminus by adjustable suction withdrawals and adjustable pressure supplies independently of thereby shifting said duct means and independently of removing said terminus.

In witness whereof I affix my signature.
ELMER I. McKESSON.